United States Patent [19]

Austin

[11] 4,136,471
[45] Jan. 30, 1979

[54] DOCUMENT CARRIER

[75] Inventor: Alan Austin, Leeds, England

[73] Assignee: Alf Cooke Bag Co. Ltd., Leeds, England

[21] Appl. No.: 715,761

[22] Filed: Aug. 19, 1976

[30] Foreign Application Priority Data

Aug. 18, 1975 [GB] United Kingdom ............... 34338/75

[51] Int. Cl.² ................................................. G09F 1/10
[52] U.S. Cl. ...................................... 40/159; 150/39; 40/10 D
[58] Field of Search ..................... 40/158, 159, 104.19, 40/405; 150/39

[56] References Cited

U.S. PATENT DOCUMENTS

| | | | |
|---|---|---|---|
| 1,689,528 | 10/1928 | Kjellerup | 150/39 X |
| 2,725,913 | 12/1955 | Horwin | 40/159 X |
| 3,091,046 | 5/1963 | Engelstein | 40/159 X |
| 3,596,393 | 8/1971 | Lithgow | 40/159 |
| 3,797,146 | 3/1974 | Holes | 40/159 |
| 3,807,074 | 4/1974 | Owens et al. | 40/159 |

Primary Examiner—Louis G. Mancene
Assistant Examiner—Wenceslao J. Contreras
Attorney, Agent, or Firm—Fred Philpitt

[57] ABSTRACT

Two sheet elements are secured together along selected lines to form a pocket to adaptable to receive a document for machine processing.

2 Claims, 3 Drawing Figures

DOCUMENT CARRIER

This invention relates to document carriers which are used for processing cheques or other documents through automatic sorting equipment. These carriers principally are used in instances where the cheques or other documents which have to be processed through automatic sorting equipment have become damaged to such an extent that they cannot be passed, or passed effectively, through the equipment. They may also be used as carriers for documents which do not and must not have a character recognition code, in such the code will be carried by the carrier only. The invention also relates to a method of and machine for manufacturing the document carriers.

It is known to provide a document carrier for processing cheques or other documents through automatic sorting equipment which operates on magnetic character recognition (MCR) and such a document carrier is provided with an indicia receiving strip adhesively secured to the document carrier, the strip having an outer surface which is readily imprintable with magnetic indicia which can be recognized by the sorting equipment.

The present invention seeks to provide a document carrier which will be suitable principally for optical character recognition (OCR), but which may also be used for magnetic character recognition in some cases, and which is manufactured according to a method and by apparatus which simplifies the production of the carrier.

According to the present invention, in one aspect, a document carrier comprises a front sheet section of generally rectangular shape and a back sheet section of substantially the same area as the front sheet section, the two sheet sections being superimposed so that a pair of longer edges and a pair of shorter edges are in alignment and define the bottom and the leading edge of the carrier, the edges of the sheet sections at the bottom of the carrier being adhered together and the top being open so that a document can be placed therein, the adhering of the edges at the bottom being so located as to provide an abutment adapted to support the document at a distance from said bottom.

Preferably, the front and rear sheet sections are formed by folding a single sheet, and there is preferably a line of adhesive at said fold between the sheet sections so as to provide a sharp and strong edge at the bottom which assists the passage of the carrier through the processing equipment.

There is preferably a second strip of adhesive between the sheet section and joining them together, said strip being parallel to the fold line and spaced therefrom to define the abutment for a document to be carried by the carrier. The spacing of said two strips of adhesive defines a print band at the bottom of the carrier on which character recognition indicia may be printed.

The sheet section will preferably be of transparent or translucent material, and may for example, be vegetable parchment, bleached greaseproof paper, polypropylene, cellophane or glassine.

The adhesive strip or each strip may be applied as a band or bands or as a series of dots. The sheet section at the front and leading edges of the carrier preferably are also adhesively connected.

The document carriers according to the invention, as will be appreciated are generally rectangular and are fed through the process equipment with one of the shorted edges leading, and the other shorter edge trailing. One of the longer sides is closed whilst the other longer side is open for the insertion of the documents. It is convenient therefore to talk about each carrier having a leading edge i.e. the edge which is fed into the processing equipment, a trailing edge, a bottom which is closed to support a document inserted in the carrier, and a top which is open to allow the insertion of the document. It will be appreciated however that in the travel of the carrier through the processing equipment the "top" and "bottom" may not be so spacially positioned and the carrier may travel in flat condition. However, it is believed that the reference to leading and trailing edges at top and bottom as used in this specification and in the appended claims is the clearest method of explaining the document carrier.

A colouring ink may be applied over the band at the bottom of the carrier, adjacent the fold line to receive character recognition indicia. Alternatively, a strip of a thickness approximately equal to the thickness of the document to be inserted in the carrier may be applied over the band so that the loaded carrier will have a substantially uniform overall thickness. By this means, the stacking of a considerable number of horizontally disposed loaded carriers will be facilitated since the vertical stack will have considerable inherent stability; also, the loaded carriers will be more readily passed through roller feed devices and other equipment.

Instead of the above mentioned strip adhered to the front portion of the carrier, a strip or bar may be applied by printing or other suitable process. As a further modification the optical bar coding may be applied directly to the material of the carrier, and for this purpose the two-ply thickness of the carrier adjacent the fold line may be increased by a further folding of the front and/or back portion of the carrier.

It is preferred that the document carriers according to the invention be for optical character recognition, and to this end it is desirable that the material of the sheet sections should flouresce to the minimal possible extent when the carrier is being processed through optical reading equipment. It is preferred that the sheet sections be of a translucent vegetable parchment sheeting as this has good anti-fluorescing characteristics.

Preferably the top of the carrier will present a lip formed by the rear sheet section extending beyond the front rear sheet section, for example to facilitate opening of the carrier and insertion and removal of documents.

According to another aspect of the invention there is provided a method of producing a plurality of document carriers as aforesaid wherein a web of the sheet material has adhesive applied thereto, defining a band extending lengthwise of the web, the web is folded lengthwise of the web to define the bottom of a plurality of the document carriers, the adhesive of the band securing the folded over web in folded condition at the bottom of the plurality of carriers and defining the abutments of said carriers, and subsequently cutting the folded web transversely to produce said plurality of carriers.

The said adhesive is preferably applied in spaced, parallel strips the spacing of which defines the width of said band. The adhesive may be applied as continuous lengths or as a plurality of dots or discreet areas to define said strips.

The folding of the web preferably takes place along one of said strips so that the adhesive at said strip will be present, in the finished carriers at the inside of the fold and will strengthen some, which is important for the effective guiding of the carriers through the equipment.

Preferably, two sets of carriers are produced simultaneously from the same web in that the adhesive is applied symmetrically about the centre line of the web and each side of the web is folded inwardly to form a plurality of end to end connected carriers lying symmetrically about the web centre line, the web subsequently being slit or otherwise cut along the centre line as well as being cut transversely to define the two sets of carriers.

The adhesive is preferably also applied in lines extending transversely of the web, the web subsequently being cut transversely along these transverse adhesive lines so that the leading and trailing edges of document carriers remain adhered together.

The adhesive used may be a thermoselling adhesive applied by a printing process, such as by gravure nodes and subsequently set by the application of heat prior to the transverse cutting of the web.

A third aspect of the invention provides a machine for producing document carriers as aforesaid, comprising means for feeding a web of the sheet material through the machine, adhesive applicator means for applying adhesive to the web as it travels through the machine so as to define a band extending lengthwise of the web folding the web lengthwise to define the bottoms of a plurality of carriers, the adhesive application means and folding means being so relatively located that when the web is folded the adhesive defining the band defines the abutment of the carrier defined by the folded web, and cutting means for cutting the folded web into individual carriers. The machine may include drying means for drying the adhesive before the folding of the web and heating means for heat setting the adhesive (of heat setting adhesive is used) after folding of the web. The heating means may be heated rollers adapted also to press the folded over web sections together as well as heat set the adhesive.

An embodiment of the invention will now be described, by way of example, with reference to the accompanying drawings, wherein:-

Figure 1:
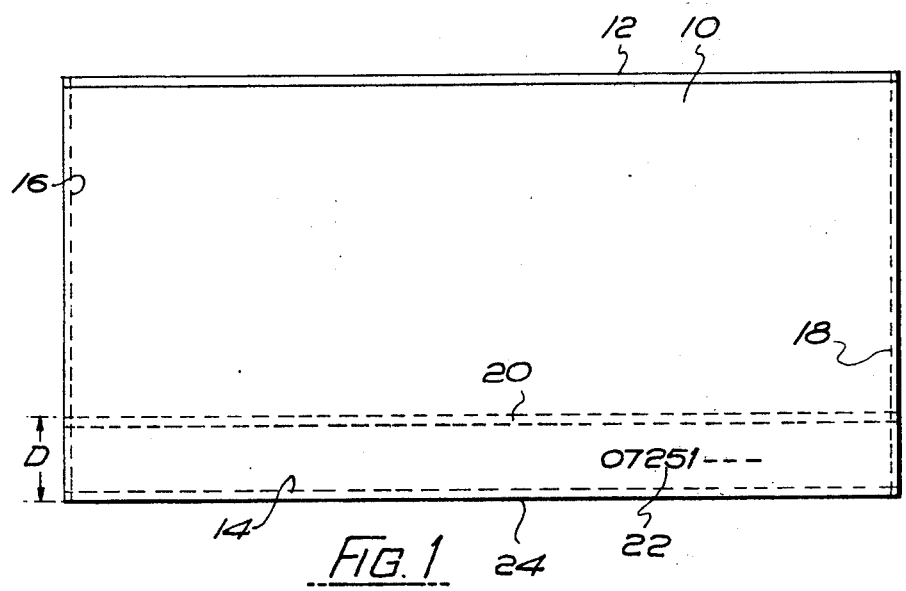
FIG. 1 is a side view of a document carrier according to the invention.

Referring to the drawings, and firstly to FIG. 1, a document carrier according to the invention is illustrated in FIG. 1. The carrier is illustrated in approximately full size, and comprises a front sheet section 10 and a rear sheet section 12. The sections are adhered together along the bottom as indicated by numeral 14, along the leading edge as indicated by 16, and along the trailing edge as indicated by 18. There is an additional strip of adhesive 20 parallel to strip 14 and spaced from the bottom edge of a carrier by distance D thereby to define a band for the reception of a character recognition code 22. The strip of adhesive 20 also in fact forms a "false bottom" for the carrier in that a document such as a cheque placed in the carrier from the top edge which is open will rest on the line of adhesive 20. A line of adhesive 20 therefore forms an abutment which supports the document.

In the production of the carrier shown in FIG. 1, the sheet sections 10 and 12 are formed from a single sheet folded in two along the bottom edge of the carrier. It will be noticed that the strip of adhesive 14 is at the bottom of the carrier at the fold line 24 and it therefore provides at edge 24 stiffening means, making the edge stronger and stiffer than it otherwise would be. This assists in the processing of the carrier through the processing equipment.

The carrier recognition code 22 in this example is for optical character recognition and is therefore an optically red code. It is desirable when providing a carrier for optical code reading that it should not fluoresce under the illumination means of the optical reading system, as otherwise purious results can arise. We prefer to make the carrier of vegetable parchment paper which has the necessary anti-fluorescing characteristics. A suitable character of guage 58 gramms per square meter has been tested, although it is to be appreciated that this is only an example of the guage of paper which can be used.

Figure 2:
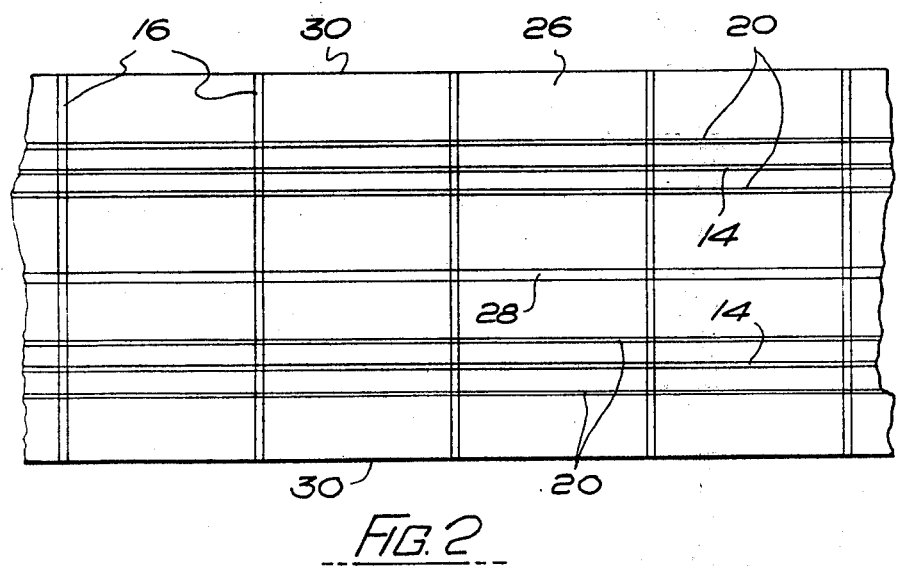
FIG. 2 is a plan view of a section of a web showing how the web is printed with adhesive for the production of document carriers as shown in FIG. 1.

The preferred method and equipment for manufacturing the document carriers as shown in FIG. 1, will now be described with reference to FIGS. 2 and 3. In FIG. 2 there is shown a web 26 of vegetable parchments from which the carriers are produced. The web 26 is approximately four times the width of the carrier shown in FIG. 1 and is used for producing two sets of carriers as shown in FIG. 1 as will appear more clearly hereinafter.

The strip of adhesive 14 is shown as applied to web 26 along two lines symmetrically disposed relative to the centre line 28 of web 26. Symmetrically disposed to each side of each strip 14 is a strip 20 of adhesive and finally trasferred strips 16 lyung at right angles to the strips 14 and 20 are applied to the web 26, the strips 16 being subsequently equally by the length of the carriers. Strips 20 are spaced by the distance D to each side of the associated strip 14. In the manufacture of the carriers from this web 26, the web is folded along each of the strips 14 so that the symmetrically arranged strips 20 in respect of each said strips 14 meet and adhere together, and where the sections of the strips 16 meet they also adhere. The edges 30 of the web 26 when it is folded as explained remain slightly spaced, and subseuently the web is slit along the centre line 28 and along the line 16 of adhesive thereby to provide two sets of document carriers each as shown in FIG. 1. By arranging that the edges 30 do not meet as explained above, after slitting of the web 28 along the centre line, the sections 10 and 12 of each carrier at the top are relatively displaced as shown clearly in FIG. 1. This spacing of the top edges of the sections 10 and 12 facilitates the placement of the document in the document carrier.

Figure 3:
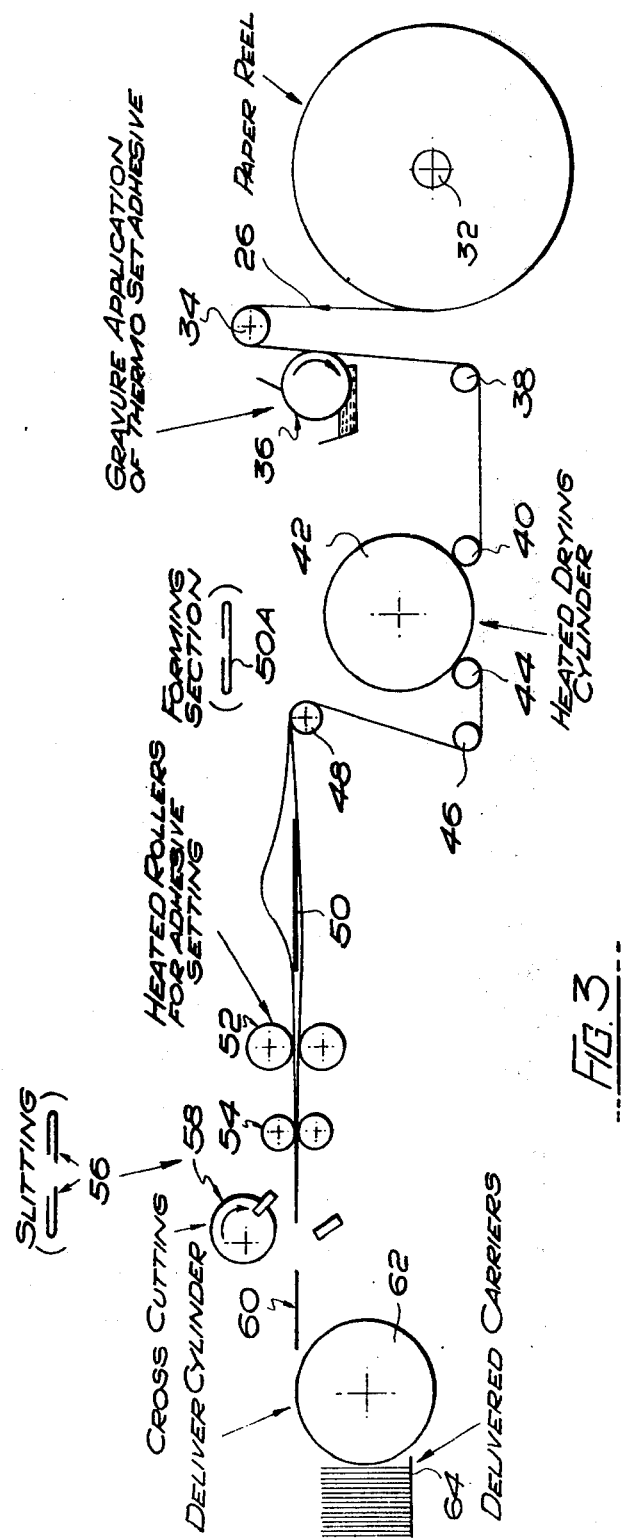
FIG. 3 is a diagrammatic side view of a machine for producing document carriers as shown in FIG. 1..

A machine for producing the carriers from the web 26 is shown in FIG. 3, and will be seen to comprise a mounting 32 for a reel of the web 26. The web 26 is moved under power from the reel firstly over a guide roller 34 and then passed a printing unit 36 whereat the adhesive strips 14, 16 and 20 are applied. The strips preferably are applied by a roller printing method. After the printing of the web with adhesives, it passes over two further guide rollers 38 and 40 and then around a heated drying cylinder 42 which dries the adhesive on the web. From roller 42 the web passes over further guide rollers 44, 46 and 48 before travelling to a forming section 50 whereat the web is folded as described above and is illustrated at 50A in FIG. 3. The thus folded web is passed to a fixing and pressing unit comprising a pair of nip rollers which are heated. These rollers press the folded sections of the web 26 together and also thermoset the adhesive if a thermosetting adhesive is used. From unit 52, the web passes to a slitting unit 54 whereat the web 26 is slit along the centre line 28 as explained previously to define two separate webs as illustrated at 56 in FIG. 3. The two separate webs each define a plurality of the carriers and a cross counting unit 58 severs the two webs along the adhesive lines 16 as shown in FIG. 2 thereby to define two sets of document carriers 60 which travel to a stacking cylinder 62. Cylinder 62 grips the document carriers and then transports them to a support decking 64 where the cylinder 62 releases its grip on the carriers and enables them to stand up edge on as shown clearly in FIG. 3.

Whilst it is appreciated that different forms of adhesive may be used, we prefer to use a low water content thermosetting adhesive of the type sold by the National Adhesive Company Limited of the Trade Mark DEXTREAM.

The process of producing the carriers according to the invention enables high speed and accurate production of the carriers which is desirable because such carriers are used in substantial quantities.

The carriers can also be used for magnetic code reading, but in this case it may be necessary to provide a suitable reception surface on the code band section of the carrier for receiving the magnetic ink.

What we claim is:

1. A document carrier comprising a single folded over sheet of material said folded over sheet including a front section and a back section that are parallel to each other said front section having the configuration of a rectangle that includes
    a first short side
    a second short side
    a first long side
    a second long side
    said back section having the configuration of a rectangle that includes
    a first short side
    a second short side
    a first long side
    a second long side (a) the edge portions of said first short sides of said front and back sections being adhered together to form a leading edge of the document carrier.
    (b) the edge portions of said second short side of said front and back sections being adhered together to form a trailing edge of the document carrier,
    (c) said first long side of said front and back sections being adhered together along the fold line that forms said front and back sections to thereby provide a sharp and strong bottom edge of the carrier.
    (d) the edge portions of said second long sides of said front and back sections being unjoined to thereby form an open top for the carrier so that it can receive a document between said front and back sections, and
    (e) said front and back sections being adhered together by a line of adhesive that extends along a line parallel to but spaced fron said bottom edge of the carrier, said line of adhesive providing an abutment which serves to support the bottom side of any document inserted through said open top at a spaced distance above said bottom edge of the carrier.

2. A document carrier according to claim 1 wherein the space between the line of adhesive and said bottom edge of the carrier defines a print band on which character recognition indicia may be applied.

* * * * *